July 7, 1936. J. H. FRIDÉN 2,047,021
TRIMMER
Filed Sept. 19, 1933 5 Sheets-Sheet 2
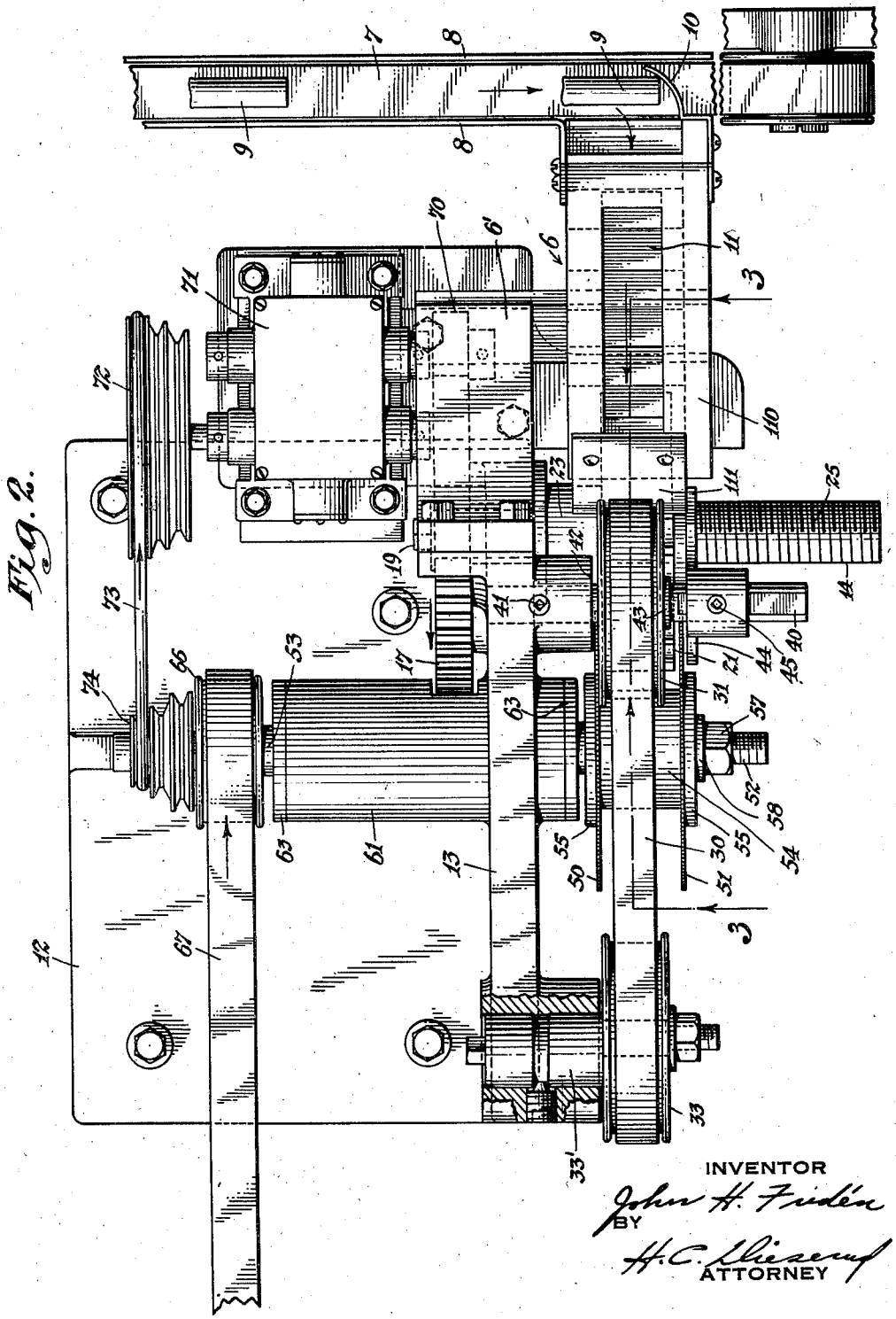
INVENTOR
John H. Fridén
BY
H. C. [illegible]
ATTORNEY

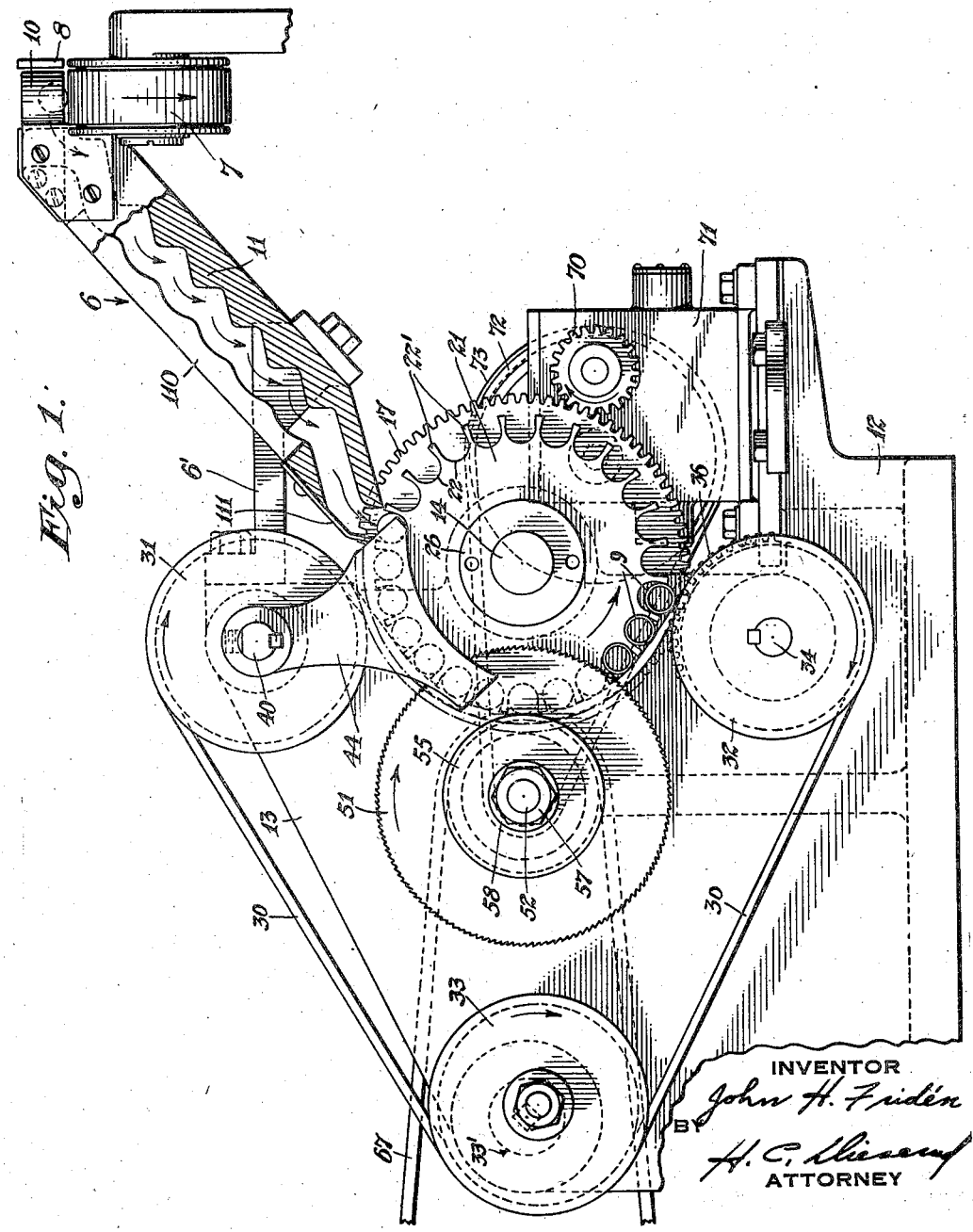

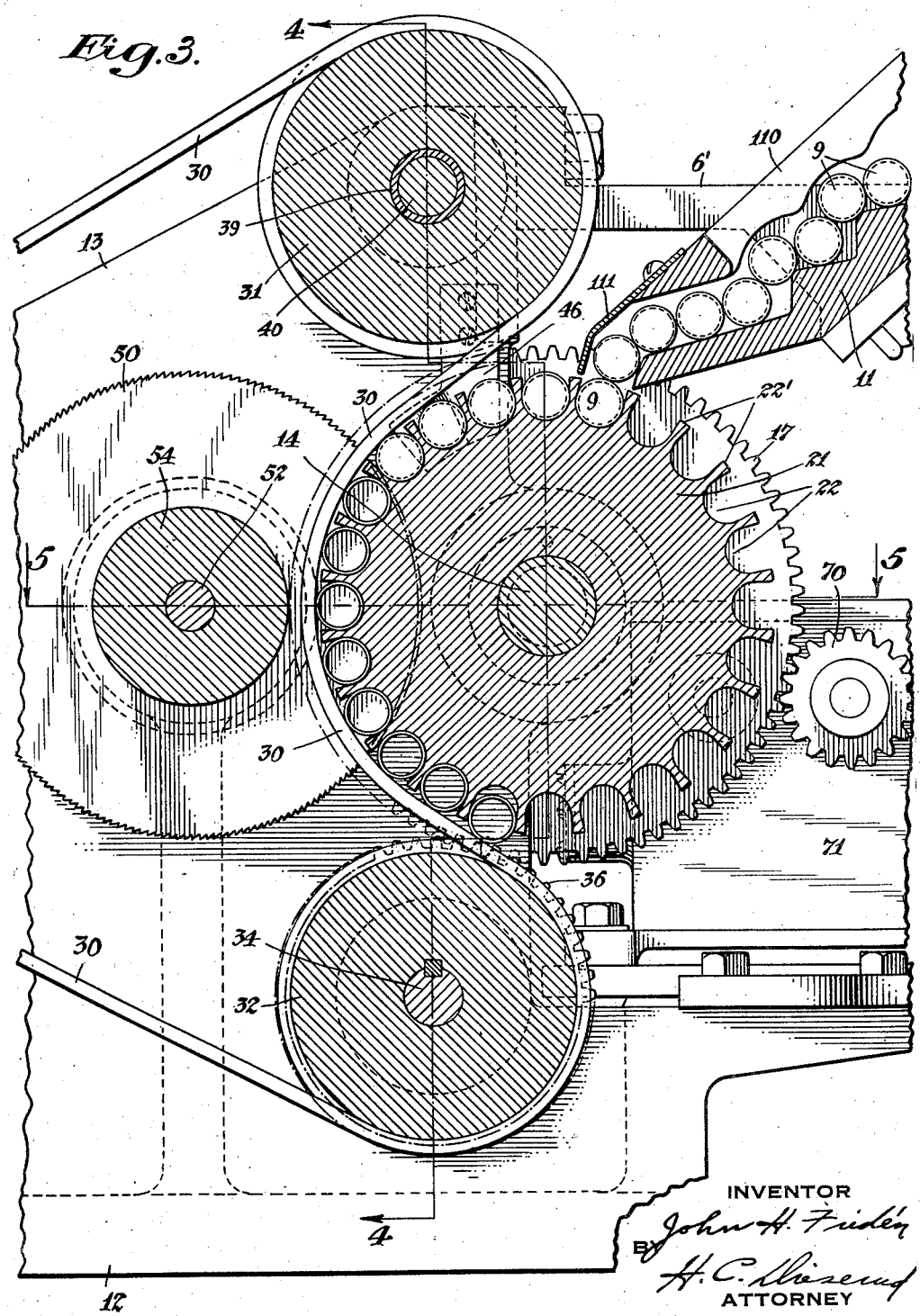

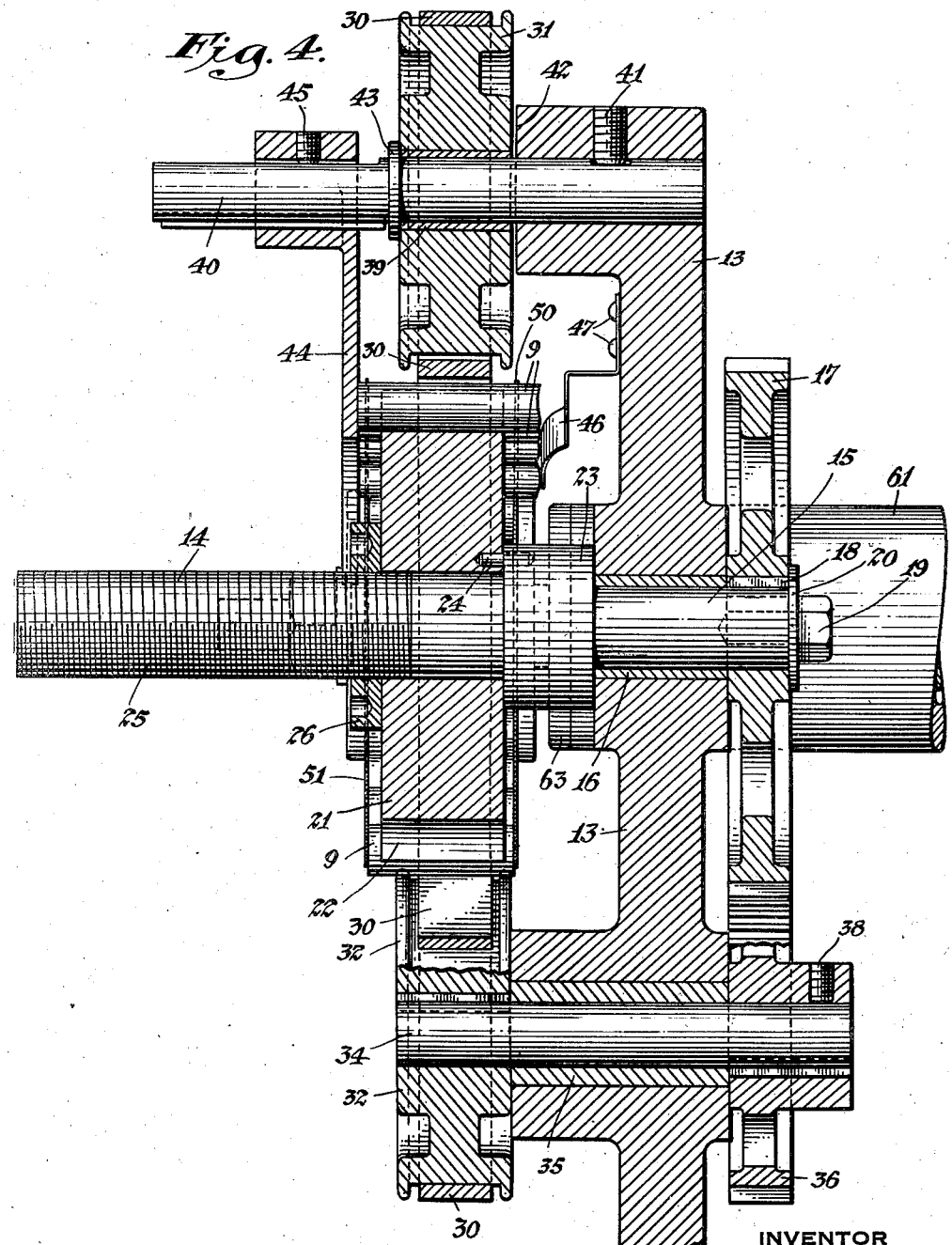

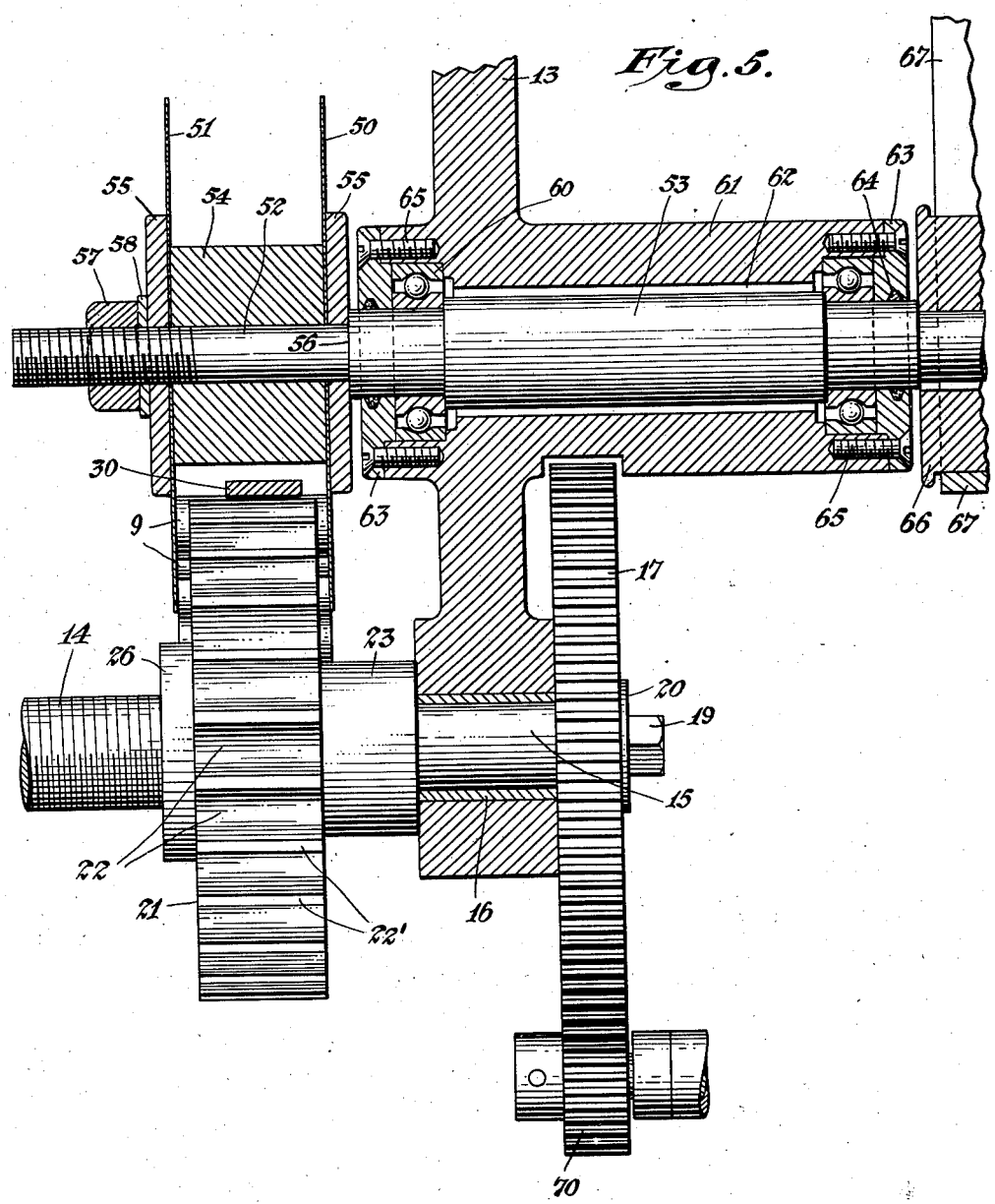

Patented July 7, 1936

2,047,021

UNITED STATES PATENT OFFICE 2,047,021

TRIMMER

John H. Fridén, East Orange, N. J., assignor to The Sun Tube Corporation, Hillside, N. J., a corporation of New Jersey Application September 19, 1933, Serial No. 690,067

9 Claims. (Cl. 29—69)

In the manufacture of cylindrical, tubular or cup-shaped members made of metal such as zinc, and commonly employed in dry cells, cylindrical condensers for radio sets, and the like, elements may be first formed with the desired general shape, save that they may be of irregular length with one or both ends rough and unfinished, and these may then have one or both ends trimmed off in order to reduce them to a uniform length and provide them with smooth or flat ends. The present invention relates to an improved machine for accomplishing such trimming.

A primary object of the invention is to provide a machine of the character indicated which is relatively simple and inexpensive to construct, rapid, efficient and automatic in operation, and durable in service. Another object is to provide such a machine which may be readily adapted to operate upon different sizes of work.

In my improved machine, in its preferred form, the various units to be trimmed are continuously fed to and supported in transverse alignment upon the perimetric surface of a revolving wheel, preferably in notches, and are held in such position by means of a travelling belt which cooperates with a portion of the circumference of the wheel while high speed cutting members trim one or both ends off the units, the units being then automatically discharged from the machine. Other features and advantages of the invention will be in part pointed out and in part apparent in connection with the following detailed description of one form of my invention, reference being had to the accompanying drawings, wherein:

Fig. 1 is a side elevation, partly in section, of one form of machine constructed in accordance with the invention.

Fig. 2 is a plan view of the machine shown in Fig. 1.

Fig. 3 is a section, on enlarged scale, taken on the line 3—3 of Fig. 2, looking in the direction of the arrows; and Figs. 4 and 5 are sections taken on the lines 4—4 and 5—5, respectively, of Fig. 3 looking in the direction of the arrows.

As illustrated in the drawings, the present machine preferably includes suitable mechanism 6 for feeding the units of work to the trimming mechanism. While the invention in its broader aspects is not confined to any particular form of feeding mechanism, such mechanism may advantageously include a belt conveyor 7, along the sides of which extend guide plates 8 for preventing the units 9, fed by the belt, from rolling off the same. It will be understood that the units may be deposited on the belt at some convenient point by hand or automatically. They may, for example, be discharged directly from an extrusion press or other forming machine onto the belt. As the units approach the end of the conveyor they may be deflected off the same in a direction at right angles thereto by a stationary arm 10, and caused to roll down a flight of inclined steps 11 which aids in aligning the units as they are fed to the trimmer. The steps may be partly or completely covered by a member 110, to prevent the units from piling up on top of one another and a member 111 may be provided at the lower end for deflecting the units into the trimmer proper. Where the units are fed by the conveyor fastener than they are received by the trimmer, the covered steps 11 may act as a magazine. The steps 11 may be supported through arm 6' upon any suitable stationary portion of the machine. The under-surface of the cover member 110 is preferably scalloped or rippled, as shown, or it may be stepped in coordinated relation to the steps 11. In any case the space between the members 11 and 110 will be such at all points that the units handled will pass rather freely between them but cannot pile one on another nor become jammed. By this arrangement any units which may be tilted in the course of deflection from the belt 7 will be righted before delivery into the trimmer.

The trimmer proper, in the particular embodiment illustrated, includes a base 12 having an upright flange 13 of suitable configuration to provide for journalling various horizontal shafts therein, as hereafter described. As best shown in Fig. 4, a shaft 14 has a reduced end 15 journalled in bushing 16, which is received in and carried by the flange 13, while the end 15, which extends beyond the rear wall of flange 13, has a gear wheel 17 secured thereon, for rotation with the shaft 14, by means of a key 18. The gear 17 is held against flange 13 by means of a washer 20 and a threaded bolt or machine screw 19 adapted to engage an internally threaded portion of the shaft 14.

On the opposite side of flange 13 from the gear 17, a wheel 21 is provided having notches or serrations 22 formed around its circumference between teeth 22' and adapted to receive the tubular members or other work to be trimmed. The grooves are preferably formed so that the work is snugly received and is prevented from angling, by reason of abutting against the walls of the teeth. For this purpose the bottoms of the grooves may conveniently be curved along a radius substantially equal to that of the units being handled and the teeth may extend radially or with substantially parallel walls at opposite sides of the grooves somewhat beyond the centers of curvature of the groove bottoms. If desired a single wheel may be adapted to receive units of different diameters within limits by the use of V-shaped grooves or grooves otherwise having tapering sides. Work pieces of square or other polygonal cross section may be handled and in that event the grooves 22 may be made of suitable angular form. The wheel 21 may have a sliding fit on shaft 14 and be caused to rotate therewith by means of collar 23 and one or more pins 24, the collar being keyed or otherwise suitably secured to the shaft and also serving as a spacer for the wheel. The outer end of shaft 14 is threaded as at 25 and an internally threaded nut 26 is engaged with the shaft for maintaining the wheel 21 against collar 23. By means of this construction it will be appreciated that the wheel may be readily replaced by wheels for receiving other sizes of work and different lengths of collars 23 may be employed to space the wheel a greater or lesser distance from the frame 13. The wheel is mounted (as best shown in Fig. 3) so that the work pieces are fed to lie in the successive notches transversely of the wheel.

When the shaft 14 is rotated, in the direction indicated by the arrow (Fig. 1), by mechanism hereinafter described, the work in the grooves 22 in the wheel is carried toward and into engagement with the means which trim the ends thereof. Mechanism of the following character may be employed to maintain the work against turning with respect to the wheel while the work is being trimmed. The depth of the several notches 22 is such that the work protrudes beyond the outside periphery of the wheel or beyond straight lines joining the outer ends of successive teeth 22'. A continuous belt 30, travelling over pulleys 31, 32 and 33, lies along a portion of the circumference of the wheel, preferably at one side of the same, the belt being adapted to grip or engage the work prior to its entry into the zone or arc of rotation in which it is trimmed, and to release it shortly after it leaves the trimming zone. For instance, the pulleys 31 and 32 may be so arranged with respect to wheel 21 that the belt 30 engages the work over, say, a 90° arc and extends at a tangent at either end of the arc. Provision is preferably made for driving the belt at the same linear speed as that of the work at the periphery of the wheel 21. Mechanism for this purpose may comprise a shaft 34 to which the pulley 32 is keyed, the shaft being journalled in a suitable bushing 35 supported in flange 13. The shaft 34 extends beyond the rear face of flange 13 and has a gear 36 keyed thereon in mesh with gear 17. The gear 36 may be maintained against lateral movement with respect to shaft 34 by any suitable device such as set screw 38. The pulleys 31 and 33 may be idlers, the latter being mounted through any suitable mechanism, such as an eccentric mounting 33' (Fig. 2) for taking up slack in the belt, and adjusting it for use in connection with different sizes of work. The pulley 31 may be mounted, through bushing 39, for rotation about stationary shaft 40, which latter is held against rotation in flange 13 by set screw 41. Undesired lateral motion of pulley 31 is provided against by means of face 42 on flange 13 and a collar 43 formed on shaft 40.

Suitable mechanism may be provided for aligning the ends of the units as they enter the notches 22, and such mechanism may advantageously comprise a depending plate 44 adapted to lie close to one side of the mouth of the feeding mechanism and across the outer ends of notches 22 in the wheel 21, the outer ends of the units abutting against this plate and being alined thereby. The plate 44 may be supported on and secured to the outer end of shaft 40 by means of a set screw 45. Where required, a spring arm 46 of any suitable configuration may be secured as at 47 to the flange 13 in order to urge the work against the member 44. In this way, the proper alignment of the work is insured in advance of the point at which the work is gripped by the belt 30.

The trimming of the work may advantageously be accomplished by circular saws 50, 51 (as best shown in Fig. 5), or by other suitable cutting members adapted to trim ends off the units while they are held in the wheel as the latter revolves. However, it will be understood that if only one end of the work is to be trimmed, either one of the saws may be omitted, depending on the way the work is delivered to and lies in the grooves 22 in the wheel 21. The saws are mounted on reduced end 52 of a shaft 53 and are held in proper relation by means of a spacer block 54 and clamping discs 55, one of which bears against a shoulder 56 on the shaft 53, a nut 57 being threaded onto the outer end of the shaft and turned up firmly against a lock washer 58 abutting against the outer disc 55. The spacer block and clamping discs may be made of suitable material capable of frictionally engaging the saws 50, 51 to prevent turning of the latter with respect to shaft 53 as the latter revolves. Other suitable means such as keys, (not shown), may be employed for this purpose if desired.

The shaft 53 is preferably mounted in bearings 60 carried in shouldered portions of a housing 61, which latter may be formed integral, if desired, with flange 13. The central portion of the interior of the housing, which is larger than the shaft, forms a cavity 62 which may be filled with oil to lubricate the bearings, and closure plates 63 provided with packing 64 may be secured across the ends of the housing as by bolts 65, to prevent egress of oil. The shaft 53 may be driven at high speed by means of a pulley 66, keyed on the shaft 53, and belt 67, from any suitable source of power (not shown).

Mechanism of the following character may be provided for operating wheel 21 from the same source of power as that which rotates the saws, as is desirable, particularly in order to insure a proper ratio between the speed of the wheel and the speed of the saws. As best shown in Figs. 1, 2 and 5, a pinion 70 in mesh with gear 17 may be driven through reduction gearing 71, pulley 72, belt 73 and pulley 74, the latter being secured for rotation with shaft 53. The pulleys 72 and 74 are preferably oppositely stepped to provide simple means for varying the speed ratios by merely moving the belt 73 from one pair of grooves to another. Driving of gear 17 through these connections will not only rotate the wheel 21 directly but will also shift the belt 30 through the connection with pinion 36 secured to pulley shaft 34.

While the invention is obviously not restricted to any size or shape of the work or to particular materials of which the work is made (considerations which affect the relative speeds at which the wheel and the cutting members are operated), as a general proposition it may be said that the cutting members should be rotated at a relatively rapid speed as compared to the speed of rotation of the wheel 21. Without limiting the invention to any particular speeds of operation, it may be said that where the material to be trimmed consists of rigid zinc cylinders in the order of one inch outside diameter with a wall thickness of about $\frac{1}{32}$ of an inch then good results may be achieved by operating the machine so that the cutting members rotate at about 3600 R. P. M. while the wheel 21 rotates at about ¾ R. P. M. Where the wheel has twenty-four notches, as shown, some eighteen units of the size indicated may thus be produced per minute. By rotating the cutters at high speed and the work holding wheel at relatively low speed the cutting action is not forced. The relationship should be such that the cutter is actually capable of cutting at a faster rate than the work is fed to it. This insures a clean cut and avoids undue pressure on the work pieces which might distort them. It is believed that the operation of the machine will be apparent from the foregoing, but it may be briefly summarized. The work, fed continuously on the conveyor 7, is forced into the stepped chute 6 and delivered through the opening at the lower end thereof into successive notches 22 in the wheel 21 which rotates in the direction of the arrow in Fig. 1. If the ends of the units are not properly aligned by the feeding means they are positioned, for instance by guide elements 44 and 46, then gripped by travelling belt 30, and passed toward the trimming members 50, 51, which preferably, though not necessarily, rotate in the direction shown by the arrow applied to one of them in Fig. 1, in order not to impede but rather aid the turning of the wheel. The work is thus trimmed and as the wheel 21 continues to revolve the succeessive trimmed pieces drop out beyond the pulley 32 into any suitable receptacle or onto a conveyor (not shown). It will be appreciated that there is thus provided a compact machine with relatively few parts which may be readily manufactured. The machine is extremely rapid in operation and at the same time is of such construction that there is little chance for it to get out of order. Moreover, its parts are readily available for servicing or repairs, if necessary. The machine is easily convertible for operation upon different sizes of work, and requires a minimum of spare parts for this purpose, it being merely necessary to replace wheel 21 with one having notches of appropriate size, adjust the belt 30 if required, and possibly substitute other cutting elements.

The terms and expressions which have been employed are used as terms of description and not of limitation, and there is no intention, in the use of such terms or expressions, of excluding any equivalents of the features shown or portions thereof, but it is recognized that various modifications are possible within the scope of the invention claimed.

I claim:

1. In a machine of the character described, means comprising a rotatable wheel adapted to support a plurality of work units about its periphery, means for rotating said wheel, means traveling with said wheel to hold the units against substantial movement with respect to the wheel as the latter rotates, means for advancing said holding means in synchronism with the rotation of said wheel rotating cutting means adapted to trim an end off each of said units while the wheel is rotating and while the units are held against movement, and means to drive the cutting means at high speed and the wheel at slow speed, and in a direction such that the cutting means assists in turning the wheel.

2. In a machine of the class described a rotatable work holder adapted to receive cylindrical work pieces, and means for feeding work pieces successively to said holder comprising an inclined chute having a stepped surface over which the work pieces roll prior to delivery to said holder.

3. In a machine of the class described a work holder adapted to receive cylindrical work pieces in a pre-determined position, and a stepped, gravity-feed member arranged to deliver work pieces successively to said holder, said member having a stepped supporting surface over which the work pieces roll prior to delivery to said holder.

4. In a machine of the class described a wheel with its axis disposed horizontally and having a series of transverse notches in its periphery, an inclined, stepped chute arranged to deliver work pieces to the top of said wheel, said chute having a stepped supporting surface over which the work pieces roll prior to delivery to said wheel, and means for rotating the wheel.

5. In a machine of the class described a work holder adapted to receive substantially cylindrical work pieces, and an inclined chute arranged to deliver such work pieces to a point adjacent said work holder, said chute having a series of transversely extending projections in its bottom forming steps over which said work pieces roll in delivery to said work holder.

6. In a machine of the class described a work holder adapted to receive substantially cylindrical work pieces, an inclined chute arranged to deliver the work pieces to a point adjacent said work holder, said chute having a series of transversely extending projections in its bottom surface forming steps over which said work pieces roll in delivery to said work holder, and means for delivering work pieces at an angle to the upper end of said chute.

7. In a machine of the class described a vertical frame member, a pair of shafts supported by said member each having a free and accessible end extending from said member, a cutter freely applicable over and detachably secured to the free end of one of said shafts, a work holder mounted over the free end of the other shaft and detachably secured thereto, said work holder being readily applicable over and removable from said other shaft and having a series of recesses of fixed dimension around its periphery to receive work pieces and carry them past said cutter, and means mounted independently of the work holder and advancing therewith for retaining the work pieces on said holder, said means being adapted to retain work pieces in holders having recesses of different diameters.

8. In a machine of the class described a vertical frame member, a pair of shafts supported by said member each having a free and accessible end extending from said member, a cutter freely applicable over and detachably secured to the free end of one of said shafts, a work holder mounted over the free end of the other shaft and detachably secured thereto, said work holder being readily applicable over and removable from said other shaft and having a series of recesses of fixed diameter around its periphery to receive work pieces and carry them past said cutter, and means for retaining the work pieces on said holder comprising a flexible belt supported by said frame member, said means being adapted to retain work pieces in holders having recesses of different diameters.

9. In a machine of the character described, a frame, a shaft supported by said frame and having one end free and accessible, a rotatable wheel mounted over the free end of said shaft adapted to support a plurality of work units about its perimeter in recesses of fixed dimension, said wheel being readily applicable over and removable from the end of said shaft, means for retaining the wheel detachably upon said shaft, means to drive the shaft, means mounted independently of the wheel to hold the units against substantial movement with respect to the wheel during a portion of a revolution of the wheel, said holding means being arranged to cooperate interchangeably with wheels having recesses of different dimensions, and means to trim an end off each of the units while so held on the wheel.

JOHN H. FRIDÉN.